United States Patent [19]

Hins

[11] Patent Number: 5,743,443

[45] Date of Patent: Apr. 28, 1998

[54] SLIT VALVE FOR CLOSING OFF CONTAINERS

[75] Inventor: Johannes Hins, Sundern, Germany

[73] Assignee: Georg Menshen GmbH & Co. KG, Finnentrop, Germany

[21] Appl. No.: 645,705

[22] Filed: May 14, 1996

[30] Foreign Application Priority Data

May 17, 1995 [DE] Germany .................. 295 08 151.1

[51] Int. Cl.⁶ ............................................. B65D 35/52
[52] U.S. Cl. ........................................... 222/490; 222/494
[58] Field of Search ........................... 222/212, 215, 222/490, 491, 494

[56] References Cited

U.S. PATENT DOCUMENTS

| | | | |
|---|---|---|---|
| 4,749,108 | 6/1988 | Dornsbusch et al. | 222/212 |
| 5,271,531 | 12/1993 | Rohr et al. | 222/494 X |
| 5,390,805 | 2/1995 | Bilani et al. | 222/490 X |
| 5,409,144 | 4/1995 | Brown | 222/494 X |
| 5,472,122 | 12/1995 | Appleby | 222/212 |
| 5,632,420 | 5/1997 | Lohrman et al. | 222/494 X |

FOREIGN PATENT DOCUMENTS

| | | |
|---|---|---|
| 0 395 380 A2 | 10/1990 | European Pat. Off. |
| 0 586 778 A1 | 3/1994 | European Pat. Off. |
| 673 584 | 1/1930 | France. |
| 2 661 127 A1 | 10/1991 | France. |

Primary Examiner—Kenneth Bomberg
Attorney, Agent, or Firm—Griffin, Butler, Whisenhunt & Szipl

[57] ABSTRACT

A self sealing slit valve for closing off a container opening comprises a diaphragm part having a slit-shaped pour opening. The diaphragm part is made of a first thermoplastic elastomer material having resilient property, which is integrally formed to a base part made of a second thermoplastic material different from the first thermoplastic elastomer material. The slit valve according to the present invention is a molded part which is formed in a single operation by a two-component injection molding process.

10 Claims, 3 Drawing Sheets

SLIT VALVE FOR CLOSING OFF CONTAINERS

TECHNICAL FIELD

The invention relates to a slit valve for closing off a container opening and more particularly to a self sealing slit valve comprising a resilient diaphragm part containing a slit-shaped pour opening.

BACKGROUND OF THE INVENTION

It is known (FR-C-673 584, EP-B-395 380) to form a slit valve separately from rubber or silicone rubber and to fasten it mechanically to a container in that e.g. a portion of the container is rimmed along a flange provided on the slit valve. Accordingly, until said slit valve is ready for use a series of forming and assembly procedures is necessary which make the product more expensive. Furthermore, due to the necessary resilient property of the material from which the entire slit valve is formed, restrictions need to be accepted as regards design, and an adequate seal of the connection between the slit valve and the container necessitates, that the assembly work must be implemented correspondingly carefully. It is also known (EP-A-586 778) to fasten a slit valve which like the above mentioned one entirely is made of rubber, to a container by means of a cap element which can be screwed onto a container neck portion to clamp the slit valve therebetween.

SUMMARY OF THE INVENTION

An object of the present invention is to provide a slit valve of the kind specified which is suitable for closing off a container opening with little effort in assembly while being adapted to be formed in a more economical manner than prior slit valves. A further object of the invention is to provide a slit valve having an improved property in use by it being able to be optimized as regards its overall design and its opening and closing functions independent of its assembly function.

This and other objects are achieved according to the present invention by a slit valve comprising a diaphragm part including a slit-shaped pour opening, said diaphragm part made of a first thermoplastic elastomer material having resilient property, which is integrally formed to a base part made of a second thermoplastic plastics material different from said first thermoplastic elastomer material.

The slit valve according to the present invention is a molded part which is formed by a two-component injection molding process as is fundamentally known e.g. from FR-A-2 661 127. The different plastics materials for the diaphragm part and the base part are integrally joined to each other so that the result of the molding procedure is a product substantially ready for use in that merely the slit-shaped pour opening needs to be formed by a subsequent cutting procedure. The base part of the slit valve may also be shaped as a closure cap in which the diaphragm part is an integral component of the closure cap.

In accordance with another aspect of the present invention a slit valve arrangement for closing off a container opening comprises a slit valve including a diaphragm part containing a slit-shaped pour opening, said diaphragm part being made of a first thermoplastic elastomer material having resilient property, which is integrally formed to a base part made of a second thermoplastic plastics material which is different from said first thermoplastic elastomer material, and a securing element adapted to be mounted to a container portion for fastening said base part of the slit valve thereto, said securing element comprising a cover part integrally hinged and swivable between a release position and a closing position relative to said diaphragm part, and a sealing ring molded to said cover part for engaging an opening in a portion of the base part oriented with respect to said sealing ring in the closing position of said cover part, a portion of said diaphragm part containing said slit shaped pour opening is expose on said opening of the base part.

BRIEF DESCRIPTION OF THE DRAWINGS

The invention will now be explained in more detail on the basis of embodiments and the drawings in which.

DETAILED DESCRIPTION

Figure 1:
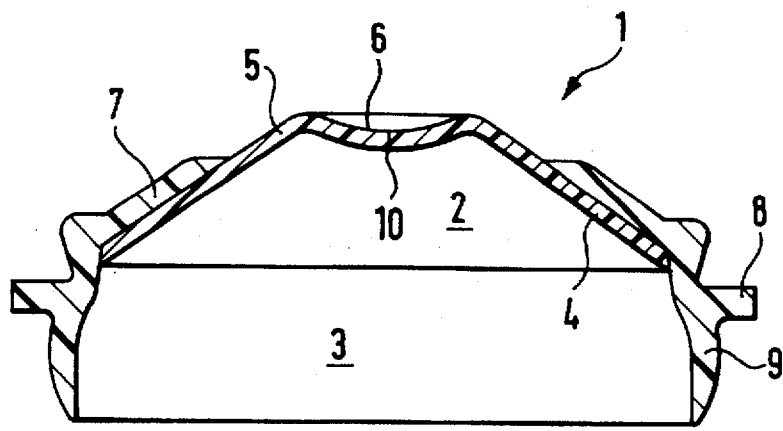
FIG. 1 is a sectioned view of a slit valve according to the present invention.

As shown in FIG. 1 a slit valve according to the invention, generally denoted by the reference numeral 1, comprises a diaphragm part 2 and a base part 3 which consist of different plastics materials. The diaphragm part 2 and the base part 3 are integrally connected to each other. In particular the slit valve 1 is an integrally molded plastics part which is produced by two-component injection molding in a single operation, to which more details are given in the following in conjunction with FIG. 3.

The slit valve 1 may be configured rotationally symmetrical, whereby the diaphragm part 2 may have approximately the configuration of a truncated cone with a peripheral portion 4 along which it is integrally connected to a supporting wall 7 of the base part 3. In the embodiment of the slit valve 1 shown in FIG. 1 the supporting wall 7 is positioned on the upper side of the peripheral wall portion 4 of the diaphragm part 2. It may however, if desired, also be molded to the lower side of the diaphragm part as is evident from FIG. 2. In any case a central upper wall portion 5 of the diaphragm part 2 is freely deformable like a rubber bellows. The central wall portion 5 may further comprise a central zone 6 which can be turned inside out between a concave and a convex position. In a central portion of the zone 6 a slit-shaped self sealing pour opening 10 is provided.

In the concave position of the central zone 6 the slit-shaped pour opening 10 is closed. It opens when the central zone 6 is caused to assume the convex configuration by the effect of a pressure acting on zone 6 from its underside. The slit-shaped pour opening 10 may be configured in the form of a short single linear incision. It may also respresent a cross-cut incision or the like, if desired.

Due to the resilient properties of the material of which the diaphragm part 2 consists, the slit-shaped pour opening 10 is closed when the diaphragm part 2 is located in the position shown in FIG. 1 with a concave configuration of the central zone 6. The slit-shaped pour opening 10 remains closed as long as a pressure acting on the central zone 6 from within does not exceed a certain limiting value. In particular this limiting value may be defined by suitably dimensioning the diaphragm part 2 so that it is higher than the pressure head of a fluid in a container which is to be closed off by a slit valve 1 according to the present invention, resulting in that an additional pressure must be exerted on the container manually to release the pour opening 10.

Figure 2:
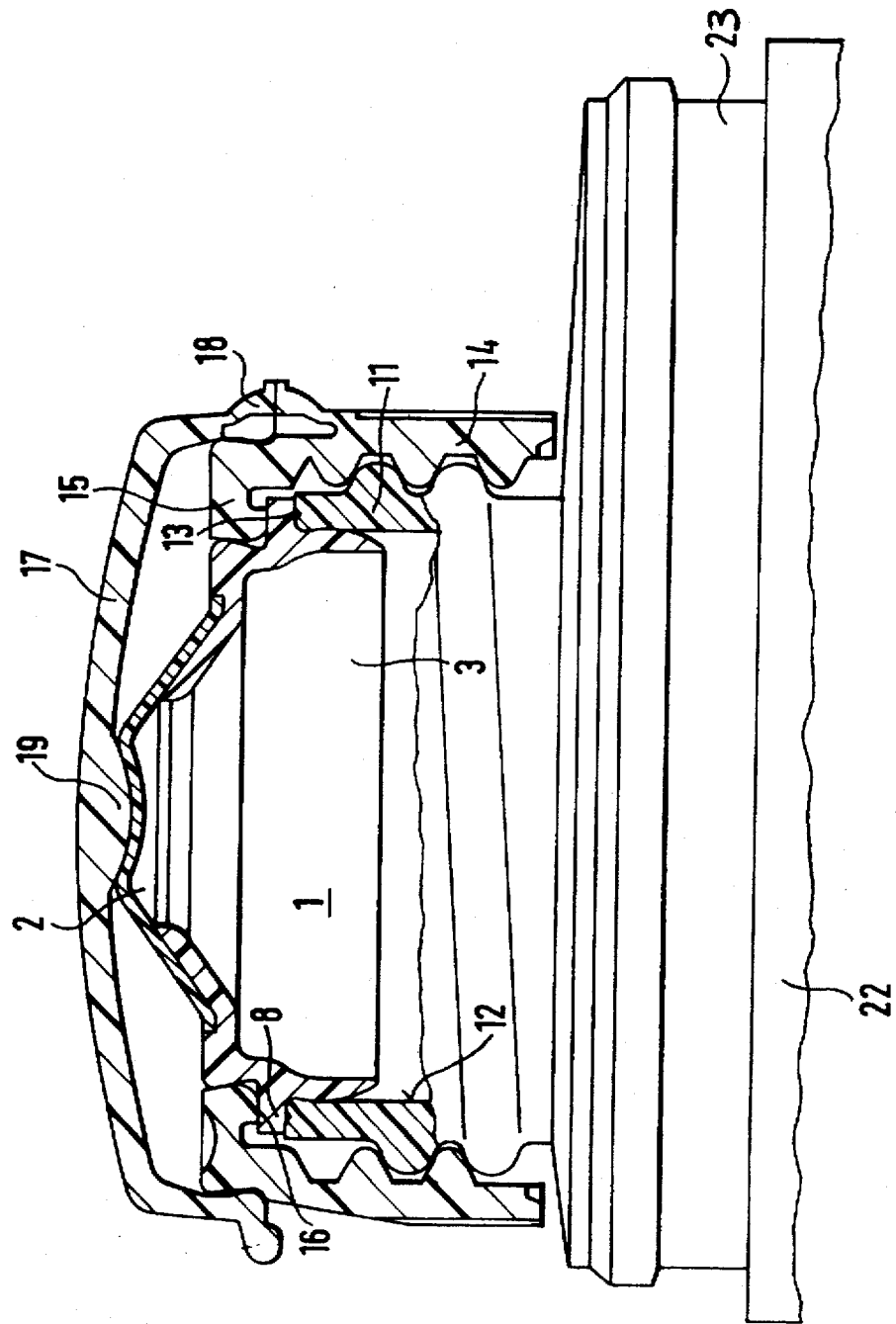
FIG. 2 shows a slit valve arrangement comprising a slit valve as shown in FIG. 1 in connection with a portion of a container shown in fragmented view.

The base part 3 comprises a mounting flange 8 extending radially outwards as well as a sealing cone 9 protruding axially downwards from the base part 3, the latter being dimensioned such that it is sealingly engagable in an opening of a container, see FIG. 2.

Although for the integral slit valve 1 according to the invention other plastics materials may be used, a preferred material for the diaphragm part 2 is a thermoplastic elastomer as is available e.g. by as type TC3-ABA from Gummiwerk Kraiburg GmbH+Co./D-84478 Waldkraiburg/ Germany. Suitable materials for the base part 3 are in particular polyolefines, e.g. polypropylene. However, other plastics material may also be used, if desired. It has been found out that the above mentioned preferred plastics materials result in a particular good integral connection of the diaphragm part 2 and base part 3 by two-component injection molding.

Figure 3:
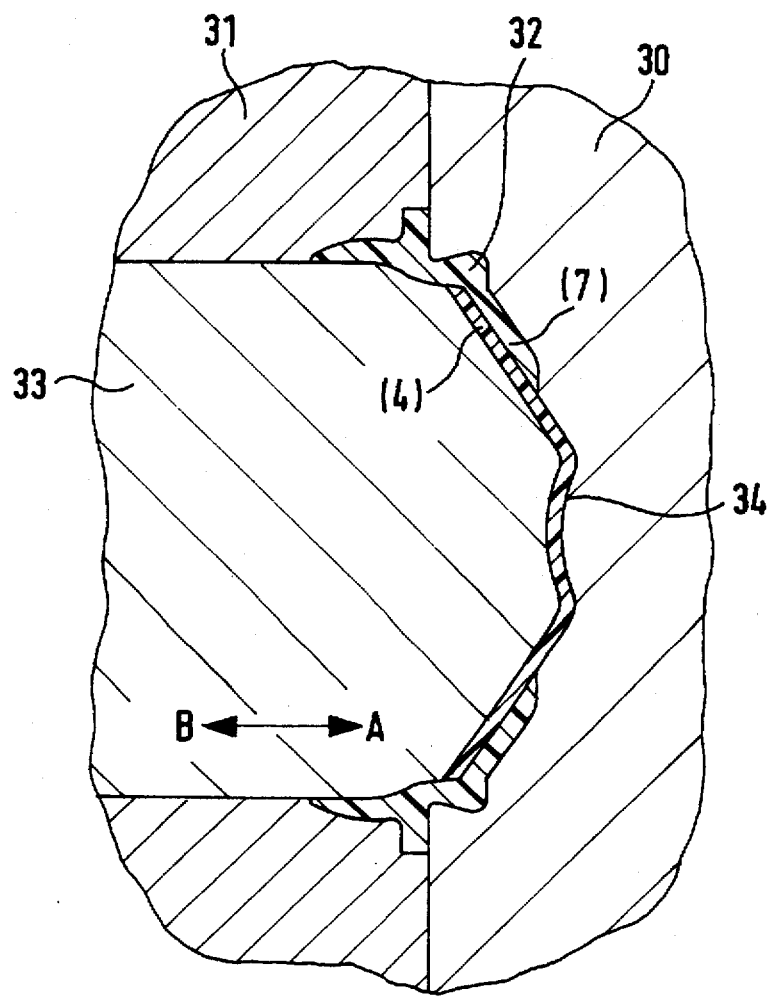
FIG. 3 is a fragmented sectioned view of a mold for two-component injection molding a slit valve according to the present invention.

FIG. 3 shows schematically a mold for two-component injection molding. Between a pair of coacting mold parts 30, 31 a molding cavity is formed indicated at 32 which corresponds to the configuration of the base part 3 of the slit valve. An axially moving center part 33 of the mold part 31 can be separately advanced to a position as is indicated in FIG. 3 by the arrows A–B in which the face of the center part 33 which is contoured correspondingly to one side of the diaphragm part 2 comes into contact with a face of a central portion of the other mold part 30 which is contoured correspondingly to the opposite side of the diaphragm part 2 resulting in that a mold cavity indicated by the cross-dashed lines at 34 and corresponding to the configuration of the diaphragm part 2 is closed. As can be seen the mold cavity 34 extends partly into the mold cavity 32 corresponding to the base part 3.

In the advanced position of the middle part 33 of mold part 31 a thermoplastic plastics material for molding the base part 3 is introduced during a first mold filling procedure into the mold cavity 32 via an injection orifice (not shown). As soon as the plastics material has cooled sufficiently in the mold cavity 32 to have an adequate dimensional stability, the axial movable middle part 33 of the mold part 31 is retracted up to a stop so that the mold cavity 34 for molding the diaphragm part 2 is formed. Via a further injection orifice (likewise not shown) the plastics material for the diaphragm part 2 is then introduced during a second molding procedure into the mold cavity 34 and subsequently allowed to solidify.

During injection into the mold cavity 34 the plastics material of the diaphragm part 2 comes into contact with that of the base part 3 along their aforementioned peripheral portions 4, 7 and the two plastics materials are thereby fused to each other, so that an integral permanent connection is formed.

Once the plastics materials in the mold cavities 32 and 34 have solidified the mold parts 30, 31 are moved away from each other to release the formed two-component molding. In a subsequent operation the slit-shaped pour opening 10 is provided in the central zone 6 of the diaphragm part 2 by means of a cutting tool.

FIG. 2 shows the slit valve as described above and shown in FIG. 1 after being arranged on a container neck 11, the sealing cone 9 of the slit valve 1 sealingly engaging the opening 12 of the container neck 11. In this arrangement the mounting flange 8 of the slit valve 1 may rest on the upper rim 13 of the container neck 11.

Screwed onto a thread of the container neck 11 is a screw fastening element 14 of a suitable rigid thermoplastic material, such as PE or PP, to fix the position of the slit valve 1 on the container neck 11. The screw fastening element 14 may include a clamping portion 15 which when the screw fastening element 14 is screwed onto the container neck 11 engages by its underside 16 the mounting flange 8 of the slit valve 1 so that the mounting flange 8 is sealingly clamped between the upper rim 13 of the container neck 11 and the lower surface 16 of the clamping portion 15 of the screw fastening element 14. It will be appreciated that instead of screw fastening element 14 any other such element mountable by snap-seating may be provided.

Furthermore, on the screw fastening element 14 a cover 17 may be integrally hinged, as is indicated at 18. The cover 17 may have a central bulge 19, the configuration of which is adapted to that of the central zone 6 of the diaphragm part 2 and creates additional closing function, in the concave position of the central zone 6, for the slit-shaped pour opening 10 of the diaphragm part 2. The cover 17 may be held in the closed position by a releasable lock on the screw fastening element 14 and may have a nose with the aid of which it can be swivelled into the release position.

The container neck 11 may also be an integral component of a container or, as is indicated in FIG. 2, represent a separate plastics part 23 which may be connected by suitable means, e.g. by bonding or hot-sealing to the container 22. The plastics part may consist of a material having a higher dimensional stability than that of the container 22 so that the container 22, if desired, may be configured as a flexible bag.

The slit valve according to the invention may also be permanently secured by means other than those above described to a container opening, e.g. by bonding, hot-sealing or by a snap fitting with omission of a screw fastening element. Furthermore, the slit valve element may be adapted to any other container configuration so that the rotationally symmetrical configuration of the slit valve element is merely by way of example.

The slit valve could also be an integral component of a closure cap, by the latter being configured together with the diaphragm part by two-component injection molding analogously to the aforementioned production of the slit valve as an integral molding.

Figure 4:
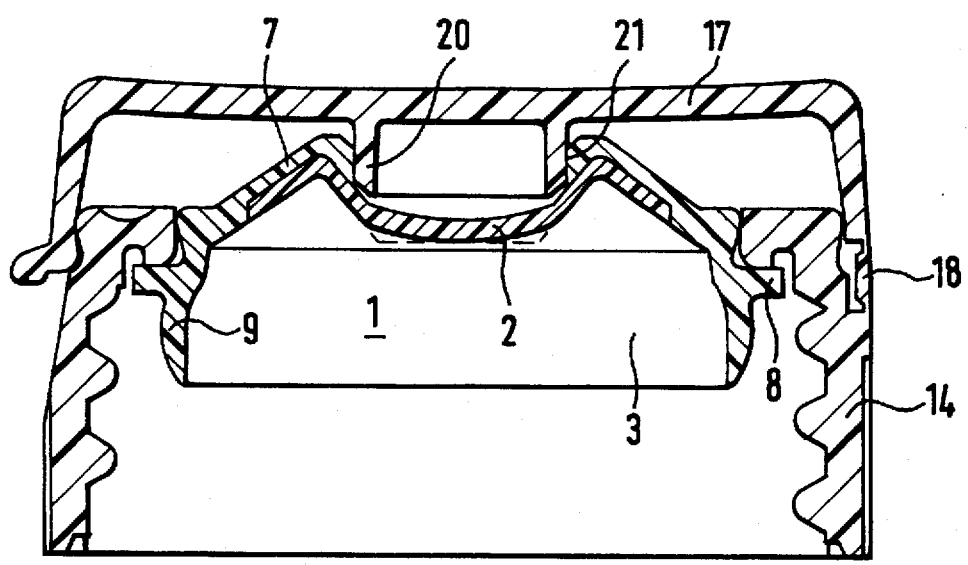
FIG. 4 is a view similar to that of FIG. 2 of a modified embodiment of a slit valve arrangement according to the invention in which the container is omitted.

FIG. 4 shows a modified slit valve arrangement comprising a slit valve 1 and a screw fastening element 14 for fixing the slit valve to a container (not shown). This arrangement differs substantially from that described above in conjunction with FIG. 2 by a sealing ring or sealing cone 20 being molded to the cover part 17 at a position oriented to an exposed portion of the diaphragm part 2 of the slit valve 1. In the closing position shown in FIG. 4 of the cover part 17 the sealing ring 20 engages an opening 21 of the base part 3 of the slit valve 1, which is defined by the supporting wall 7 of the base part 3. The supporting wall 7 of the present embodiment of the invention is as compared to the embodiment of the slit valve according to FIG. 1 correspondingly extended. In the portion of the opening 21, a portion of the diaphragm part 2 comprising the pour opening is exposed and may be turned inside out by the sealing ring 20 into the concave position shown. The arrangement according to FIG. 4 features a further improved sealing function as compared to that of the slit valve arrangement according to FIG. 2. As regards the remaining parts of the embodiment according to FIG. 4 reference may be made to FIG. 2 and the associated description.

What is claimed is:

1. A slit valve for closing off a container opening comprising a diaphragm part having a slit-shaped pour opening and made of a first thermoplastic elastomer material having resilient property, said diaphragm part being integrally molded onto a base part of a second thermoplastic material different from said first thermoplastic elastomer material so as to be formed as one piece therewith.

2. The slit valve as set forth in claim 1, wherein said base part is configured for direct fastening to said container opening.

3. The slit valve as set forth in claim 1, wherein said base part is shaped as a container closure cap.

4. The slit valve as set forth in claim 1, wherein said second thermoplastic material is a material consisting of the group of polyolefines.

5. The slit valve as set forth in claim 4, wherein said second thermoplastic material is polypropylene.

6. The slit valve as set forth in claim 1, wherein said diaphragm part is dimensioned so that said slit-shaped pour opening opens when a certain pressure is exceeded which is higher than the pressure head of a fluid volume in a container to be sealed off.

7. The slit valve as set forth in claim 1, wherein said diaphragm part comprises an exposed portion including said slit-shaped pour opening which can be turned inside out between a concave and a convex position.

8. A slit valve arrangement for closing off a container opening comprising a slit valve having a diaphragm part having a slit-shaped pour opening, said diaphragm part being made of a first thermoplastic elastomer material having resilient property, and being integrally molded onto a base part made of a second thermoplastic material different from said first thermoplastic elastomer material, and a securing element adapted to be mounted to a container portion for fastening the base part of the slit valve to the container portion, said securing element comprising a cover part integrally hinged thereto and swivable between a release position and a closing position relative to said diaphragm part, and a sealing ring molded to said cover part for engaging an opening in the base part of the slit valve, which is oriented with respect to said sealing ring in the closing position of the cover part, a portion of said diaphragm part containing said slit shaped pour opening is exposed at said opening of the base part.

9. The slit valve arrangement as set forth in claim 8, wherein said exposed portion of said diaphragm part can be turned inside out between a concave and a convex position.

10. The slit valve arrangement as set forth in claim 8, wherein said exposed portion of said diaphragm part is dimensioned so that said slit-shaped pour opening opens on a certain pressure, which is higher than the pressure head of a fluid volume to be sealed off, being exceeded, when said cover part is located in the release position.

* * * * *